(12) United States Patent
Le Roy-Delage et al.

(10) Patent No.: US 7,402,204 B2
(45) Date of Patent: Jul. 22, 2008

(54) FLEXIBLE CEMENTING COMPOSITIONS AND METHODS FOR HIGH-TEMPERATURE WELLS

(75) Inventors: Sylvaine Le Roy-Delage, Paris (FR); Simon James, Le Plessis Robinson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 148 days.

(21) Appl. No.: 10/547,824

(22) PCT Filed: Feb. 18, 2004

(86) PCT No.: PCT/EP2004/001610

§ 371 (c)(1),
(2), (4) Date: Sep. 2, 2005

(87) PCT Pub. No.: WO2004/078671

PCT Pub. Date: Sep. 16, 2004

(65) Prior Publication Data

US 2006/0183819 A1 Aug. 17, 2006

(30) Foreign Application Priority Data

Mar. 7, 2003 (GB) ................................. 0305271.9

(51) Int. Cl.
C04B 7/00 (2006.01)
C04B 14/00 (2006.01)
(52) U.S. Cl. .................. 106/724; 106/719; 166/250.14; 166/285; 166/293; 166/292; 522/24; 522/151; 522/566; 524/2; 524/426

(58) Field of Classification Search ................ 106/724, 106/719; 166/250.14, 285, 293, 292; 524/2, 524/426; 522/24, 151, 566
See application file for complete search history.

(56) References Cited

U.S. PATENT DOCUMENTS

| | | | | |
|---|---|---|---|---|
| 3,669,418 | A * | 6/1972 | Cornwell et al. | 366/5 |
| 3,955,992 | A * | 5/1976 | Roberts | 106/724 |
| 4,039,170 | A * | 8/1977 | Cornwell et al. | 366/19 |
| 4,340,427 | A * | 7/1982 | Sutton | 106/641 |
| 4,390,371 | A * | 6/1983 | Cornwell | 106/644 |
| 4,631,309 | A | 12/1986 | Thormer et al. | |
| 4,676,317 | A * | 6/1987 | Fry et al. | 166/293 |
| 5,069,721 | A * | 12/1991 | Tamura et al. | 106/724 |
| 5,135,577 | A | 8/1992 | Brothers | |
| 5,665,183 | A * | 9/1997 | Kresge et al. | 152/204 |
| 5,725,652 | A * | 3/1998 | Shulman | 106/677 |
| 6,508,305 | B1 | 1/2003 | Brannon et al. | |
| 6,537,366 | B1 * | 3/2003 | Supplee, Sr. | 106/712 |
| 6,907,929 | B2 * | 6/2005 | Leroy-Delage et al. | 166/293 |
| 7,156,173 | B2 * | 1/2007 | Mueller | 166/293 |

(Continued)

FOREIGN PATENT DOCUMENTS

WO WO 01/25163 4/2001

*Primary Examiner*—Jerry Lorengo
*Assistant Examiner*—Pegah Parvini
(74) *Attorney, Agent, or Firm*—David Cate; Robin Nava; Dale Gaudier

(57) ABSTRACT

A well cementing composition comprises an hydraulic cement and flexible, acrylonitrile-butadiene copolymer particulate material. A method of cementing a well comprises mixing the composition with sufficient water, and optionally, other additives to form a pumpable slurry, and pumping the slurry into the well and allowing it to set.

17 Claims, 2 Drawing Sheets

U.S. PATENT DOCUMENTS

Figure 1:
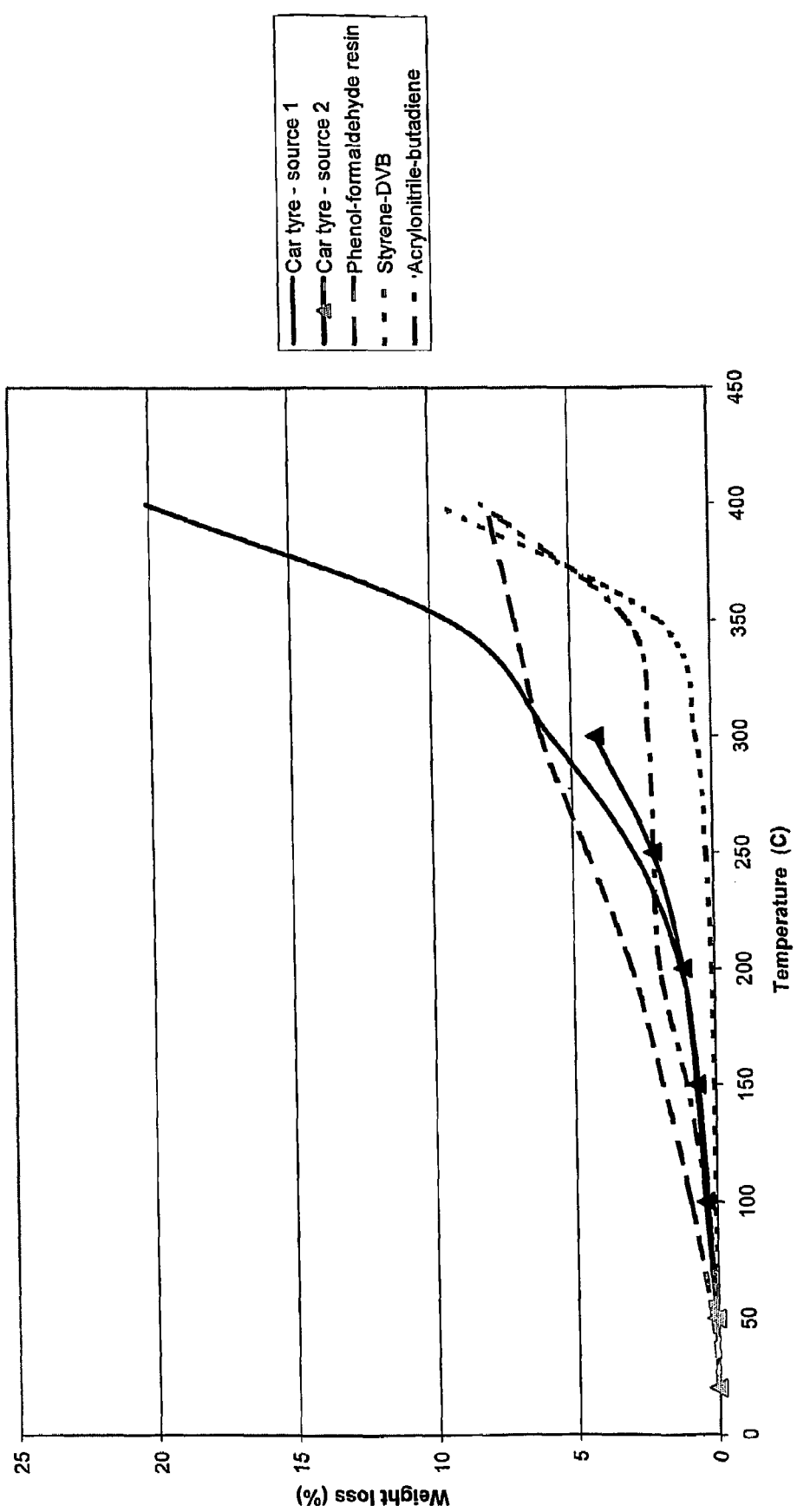

| | | |
|---|---|---|
| 2003/0116319 A1 | 6/2003 | Culotta et al. |
| 2003/0234102 A1 | 12/2003 | Lance |
| 2004/0007360 A1* | 1/2004 | Leroy-Delage et al. ...... 166/293 |
| 2004/0259982 A1* | 12/2004 | Bair et al. ...................... 524/5 |

* cited by examiner

FLEXIBLE CEMENTING COMPOSITIONS AND METHODS FOR HIGH-TEMPERATURE WELLS

The present invention relates to compositions and methods for cementing wells such as oil well, gas wells, geothermal wells, steam injection wells or the like. In particular, the invention provides compositions and methods suitable for cementing such wells that are exposed to high temperatures.

When completing wells of the type to which this invention relates, it is common to install a metal casing inside the well after it has been drilled and to fill the space between the outside of the casing and the borehole wall with cement to provide physical stability and isolation of the various fluid containing zones through which the well passes. Over the life of the well, the cement can be exposed to changing stresses. Some of these changes, such as those caused by pressure testing of the casing or temperature increases due to steam injection, may be sufficient to cause the cement to crack, leading to loss of zonal isolation.

There have previously been a number of approaches to providing a cement composition with modified mechanical properties particularly to provide a degree of flexibility. Well Cementing 1990, E. B. Nelson, Schlumberger Educational Services, discusses the use of ground rubber in the 4-20 mesh range to improve the mechanical properties of cement. U.S. Pat. No. 5,779,787 discloses the use of vulcanized rubber particles, derived from car tyres, to improve the mechanical properties of cement.

WO 00/20350, WO 00/37387 and WO 01/25163 all disclose the use of flexible particles incorporated in cement to provide a degree of flexibility in the cement and some protection against the detrimental effects of induced stresses in the cement. WO 00/20350 discloses cement compositions that use rubber particles to provide flexibility. WO 00/37387 proposes the use of flexible particles having grain sizes of less than 500 mm, Young's modulus of less than 5000 MPa and densities of less than 1.5 g/cm$^3$. Suitable materials in this role are thermoplastics, especially polyamides, polypropylene, polyethylene, etc., and polymer such as styrene divinyl benzene or styrene butadiene rubber (SBR). WO 01/25163 discloses the use of flexible particles with low compressibility together with dense material (hematite) to provide heavier flexible cements. The use of phenol-formaldehyde resins to modify cement mechanical properties is disclosed in UK Patent Application No. 0203505.3.

While these approaches can provide flexible cements that are resistant to induced stresses due to pressure and temperature variations, problems can occur if the well is also exposed to higher temperatures (e.g. 300° C.) such as can be encountered in steam injection wells, or geothermal wells. Current additives are not suitable for high temperature (up to 300° C.) applications as they either melt at lower temperatures (e.g. thermoplastics like polypropylene and polyethylene) or degrade at high temperatures (e.g. ground car tyres). There are several high performance engineering thermoplastics available (PEEK, Ryton, PTFE) that are stable to high temperatures and in highly alkaline environments (as occur in cement), but their cost is prohibitive for use in quantities required for well cementing applications. Cost is also a limiting factor for highly specialized rubbers e.g. Viton rubber.

U.S. Pat. No. 5,518,996 discloses the use of controlled particle size cement systems for ensuring good physical properties in use.

It is an object of the present invention to provide cement compositions and cementing methods that can provide flexibility without losing properties at high temperatures.

In accordance with a first aspect of the present invention, there is provided a well cementing composition comprising an hydraulic cement and a flexible, acrylonitrile-butadiene copolymer particulate material.

Preferably, the acrylonitrile content of the copolymer is between 18% and 50%, more preferably between 30% and 45%.

The copolymer may also be partially or fully hydrogenated.

Carboxylate monomers can be added to the copolymer to improve the thermal properties.

The copolymer may also have functional groups attached to the main chain to modify the properties of the base copolymer.

Nitrile rubber (acrylonitrile-butadiene copolymer) is a suitable product that combines the benefits of high temperature stability in the downhole cement environment with reasonable cost. Various chemical modifications to the base acrylonitrile-butadiene are also possible, leading to products with improved performance. For example terpolymers of acrylonitrile, butadiene and an unsaturated carboxylic acid (e.g. Krynac®X grades from Bayer) provide increased resistance to stress and wear. The base acrylonitrile-butadiene rubber polymer can also be partially or fully hydrogenated to improve the resistance to stress, e.g. the Therban® range of products from Bayer. These base products may be compounded, vulcanized (cross-linked) and then ground to produce a suitable particle for use in oilfield cement. Commercially available particulate forms of acrylonitrile-butadiene are Baymod N XL 38.20 from Bayer, Speciality Products Business Group, Chemigum P86F from Eliokem and Nipol 1411 from Zeon Corporation.

A second aspect of the invention comprises a method of cementing a well comprising mixing a composition according to the first aspect of the invention with sufficient water, and optionally, other additives to form a pumpable slurry, and pumping the slurry into the well and allowing it to set.

The acrylonitrile-butadiene copolymer particles can be incorporated as flexible particles into cement formulations e.g. cement, silica and flexible particles with antifoam, dispersants, surfactants, retarders and fluid loss control additives as required. The particles can also be used in controlled particle size cement formulations where there is a fine particle, a medium particle (often cement) and a large particle (the flexible particle).

In use, the compositions according to the invention can be mixed on site for use, or provided in pre-mixed blends of solid materials to which water and other liquid components are added prior to pumping into the well.

Figure 2B:
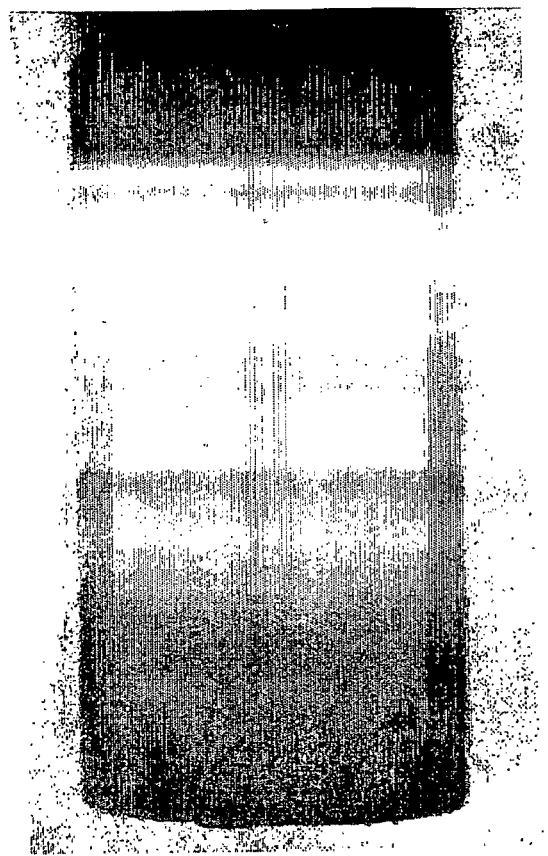
Figure 2A:
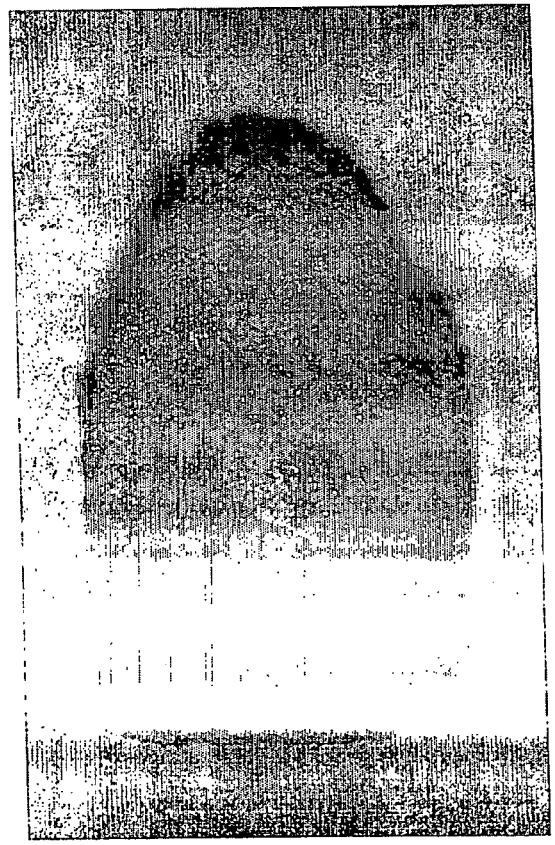

The present invention will now be described by way of examples and with reference to the accompanying drawings, in which:

FIG. 1 shows a plot of weight loss vs. temperature for various flexible particles; and FIGS. 2a and 2b show comparative samples of a prior art composition and a composition according to the invention after aging at temperature.

EXAMPLE 1

Thermogravimetric measurements are made on a sample of acrylonitrile-butadiene rubber particles (Chemigum P86F from Eliokem), two sources of ground recycled rubber product, a phenol-formaldehyde resin product and a styrene-divinylbenzene (S-DVB) bead. The heating rate is 2.5° C./min and a nitrogen atmosphere is used. Rapid loss of weight corresponds to thermal degradation of the product. From the plot shown in FIG. 1, it is clear that the acrylonitrile-butadiene copolymer and S-DVB bead show very little weight loss at temperatures up to 350° C., indicating that they are stable under these test conditions. The two samples of car tyre, on the other hand, show rapid weight loss above 250° C., indicating degradation and loss of properties.

EXAMPLE 2

Two trimodal cement slurries are made with identical formulations (summarized in Table 1 below) except that in one case the flexible particle are S-DVB and in the other the flexible particles are acrylonitrile-butadiene (Chemigum P86F from Eliokem with a median particle size of approximately 400 microns). In both formulations the flexible particles are added at equal volumes—the density difference between the particles giving the different masses and the different final slurry density. The concentrations of antifoam, surfactant and fluid loss additive are added at a constant ratio per mass of solid particles.

TABLE 1

Formulations to compare the effect of acrylonitrile-butadiene and S-DVB particles on cement performance.

|  | S-DVB | Acrylonitrile-butadiene |
|---|---|---|
| Cement (Class G) | 320.27 g/600 ml | 320.27 g/600 ml |
| Micro silica | 133.84 g/600 ml | 133.84 g/600 ml |
| Flexible particle | 193.90 g/600 ml | 181.22 g/600 ml |
| Surfactant | 14.3 g/600 ml | 14.1 g/600 ml |
| Antifoam agent | 1.62 g/600 ml | 1.58 g/600 ml |
| Anti-settling agent | 1.30 g/600 ml | 1.27 g/600 ml |
| Porosity | 45% | 45% |
| Density | 12.79 lb/gal | 12.61 lb/gal |

The cement slurries are cured at 170° F. and 3000 psi for 7 days, sufficient time for the maximum compressive strength, at this temperature, to be obtained. After 7 days the cement is cooled down and cylinders of cement 1-inch diameter and 2 inches long cut from the set cement. These cylinders are then cured for 1 month at 300° C. and 3000 psi in water to simulate exposure to steam in a steam injection well. After 1 month the cement is cooled down and the cylinders removed for examination. The cylinders made with acrylonitrile-butadiene particles remain intact (FIG. 2b) whereas the cement cylinders made with S-DVB particles are severely damaged: the cement has crumbled away leaving a short, rounded cylinder, approximately 75% of the original length (FIG. 2a) and cannot be tested further.

EXAMPLE 3

The cement formulation with acrylonitrile-butadiene given in Table 2 below is cured at 170° F. and 3000 psi for 7 days, sufficient time for the maximum compressive strength, at this temperature, to be obtained. The acrylonitrile-butadiene product is similar to that in example 2 (from Eliokem), but had a median particle size of 170 microns.

TABLE 2

A cement system formulated with acrylonitrile-butadiene particles used to examine the effect of aging time at 300° C. on cement mechanical properties.

|  | Acrylonitrile-butadiene |
|---|---|
| Cement (Class G) | 320.27 g/600 ml |
| Micro silica | 133.84 g/600 ml |
| Flexible particle | 181.22 g/600 ml |
| Surfactant | 14.1 g/600 ml |
| Antifoam agent | 1.58 g/600 ml |
| Anti-settling agent | 1.27 g/600 ml |
| Porosity | 45% |
| Density | 12.61 lb/gal |

After 7 days the cement is cooled down and cylinders of cement 1-inch diameter and 2 inches long are cut from the set cement. These cylinders are then cured for 33 and 52 days at 300° C. and 3000 psi in water to simulate exposure to steam in a steam injection well. After the aging period the cement is cooled down and the cylinders removed for testing. The Young's modulus and compressive strength are measured by conventional techniques (see for example Handbook on Mechanical Properties of Rocks (Vol. 1-4, V.S. Vutukuri, R.D. Lama and S.S. Saluja, Transtech Publishing, 1974). The properties of the system as a function of aging time are given in Table 3 below.

The compressive strength increases with aging temperature due to the development of different mineralogical phases in the cement matrix. The compressive strength remains constant, within experimental error, for 52 days at 300° C. The Young's modulus remains low and constant for 52 days at 300° C. As a comparison the Young's modulus of a conventional 15.8 ppg system (class G cement, 35% bwoc silica, antifoam and dispersant) is shown under the same conditions. The acrylonitrile-butadiene system maintains much lower Young's modulus than the conventional system. This is important to maintain zonal isolation in some situations (e.g. IADC/SPE59132 "New Cement Systems for Durable Zonal Isolation," paper presented at the 2000 IADC/SPE Drilling conference held in New Orleans, La., Feb. 23-25, 2000).

TABLE 3

Mechanical properties of cement systems formulated from acrylonitrile-butadiene particles and a conventional system after aging at 300° C.

|  | 7 days at 77° C. | 33 days at 300° C. | 52 days at 300° C. |
|---|---|---|---|
| Acrylonitrile-butadiene system |  |  |  |
| Compressive strength (MPa) | 5.1 ± 0.5 | 9.6 ± 0.5 | 9.1 ± 0.5 |
| Young's modulus (MPa) | 1950 ± 200 | 1475 ± 200 | 1480 ± 200 |
| Conventional system |  |  |  |
| Compressive strength (MPa) | 49 ± 1 | 57 ± 1 | 47 ± 1 |
| Young's modulus (MPa) | 8400 ± 200 | 9900 ± 200 | 10800 ± 200 |

EXAMPLE 4

The permeability to water of the system of example 3 is measured in a conventional manner, using a Hassler cell with a confining pressure of 400 psi. The permeability of a conventional 15.8 ppg system (class G cement, 35% bwoc silica, antifoam agent and dispersant) under the same conditions is also measured. The results are given in Table 4. The flexible particle system maintains low permeability (<0.1 md) even after 52 days at 300° C.

TABLE 4

Permeability of cement systems formulated with acrylonitrile-butadiene particles and a conventional 15.8 ppg system with 35% bwoc silica, after aging at 300°C.

| | 7 days at 77° C. | 33 days at 300° C. | 52 days at 300° C. |
|---|---|---|---|
| 15.8 ppg system | <0.01 md | 0.057 md | 0.047 md |
| Flexible particle system | <0.01 md | 0.041 md | 0.094 md |

EXAMPLE 5

A system containing acrylonitrile-butadiene particles is optimized to provide a required thickening time and fluid loss control. The designs of two systems with different thickening times are given in Table 5. The BHCT of 77° C. simulates the case of a well prior to exposure to steam injection temperatures.

TABLE 5

Cement formulations made with acrylonitrile-butadiene particles. The difference in the two systems is the retarder concentration.

| | System 1 | System 2 |
|---|---|---|
| Cement (Class G) | 332.6 g/600 ml | 332.6 g/600 ml |
| Micro silica | 118.1 g/600 ml | 118.1 g/600 ml |
| Acrylonitrile-butadiene particle | 181.5 g/600 ml | 181.5 g/600 ml |
| Dispersant | 1.96 g/600 ml | 1.96 g/600 ml |
| Antifoam agent | 1.58 g/600 ml | 1.58 g/600 ml |
| Lignosulphonate Retarder | 6.23 g/600 ml | 3.11 g/600 ml |
| Polymeric fluid loss additive | 19.92 g/600 ml | 19.92 g/600 ml |
| Porosity | 45% | 45% |
| Density | 12.61 lb/gal | 12.61 lb/gal |

The properties of the slurries given in Table 5 are shown in Table 6. The properties were measured according to standard API (American Petroleum Institute) procedures. The thickening time of the slurry can be controlled as in a conventional system by increasing the concentration of retarder. The lignosulphonate retarder also acts as a dispersant which is why the gels are higher in the system with less retarder. The fluid loss and free water of system 1 are good.

TABLE 6

Properties of the slurries given in Table 5.

| | System 1 | System 2 |
|---|---|---|
| Rheology after mixing at room temperature | | |
| PV | 212 cP | 203 cP |
| YP | 6.7 lb/100 ft$^2$ | 5.6 lb/100 ft$^2$ |
| Reology after conditioning at 77° C. | | |
| PV | 145 cP | 151 cP |
| YP | 9.4 lb/100 ft$^2$ | 9.8 lb/100 ft$^2$ |
| 10 second gel | 5 lb/100 ft$^2$ | 15 lb/100 ft$^2$ |
| 10 minute gel | 27 lb/100 ft$^2$ | 26 lb/100 ft$^2$ |
| 1 minute stirring | 10 lb/100 ft$^2$ | 15 lb/100 ft$^2$ |
| Free water API at 77° C. | 0 mL | 0 mL |
| Fluid loss API at 77° C. | 32 mL | — |
| Thickening time 30 to 100 BC | 10 hrs 44 mins | 4 hrs 24 mins |

The invention claimed is:

1. A well cementing composition comprising an hydraulic cement and a flexible, acrylonitrile-butadiene copolymer particulate material wherein the copolymer is partially or fully hydrogenated.

2. The composition of claim 1, wherein the acrylonitrile content of the copolymer is between 18% and 50%.

3. The composition of claim 2, wherein the acrylonitrile content of the copolymer is between 30% and 45%.

4. The composition of claim 1, wherein the copolymer comprises carboxylate monomers to improve the thermal properties.

5. The composition of claim 1, wherein the copolymer has functional groups attached to the main chain to modify the properties of the base copolymer.

6. The composition of claim 4, wherein the copolymer has functional groups attached to the main chain to modify the properties of the base copolymer.

7. The composition of claim 1, further comprising hematite or manganese dioxide particulate.

8. The composition of claim 4, further comprising hematite or manganese dioxide particulate.

9. The composition of claim 5, further comprising hematite or manganese dioxide particulate.

10. The composition of claim 6, further comprising hematite or manganese dioxide particulate.

11. The composition of claim 1, wherein the copolymer has a median particle size in the range 100-500 microns.

12. A method of cementing a well comprising mixing a composition as claimed in claim 1 with sufficient water, and optionally, other additives to form a pumpable slurry, and pumping the slurry into the well and allowing it to set.

13. The method of claim 12, wherein the other additives comprise silica, antifoaming agents, dispersants, surfactants, retarders, weighting agents, expansion additives and fluid loss control additives.

14. The method of claim 12, wherein the compositions are mixed on site.

15. The method of claim 12, wherein the compositions are mixed on site.

16. The method of claim 12, wherein solid materials used in the compositions are provided in pre-mixed blends to which water and other liquid components are added prior to pumping into the well.

17. The method of claim 12, wherein solid materials used in the compositions are provided in pre-mixed blends to which water and other liquid components are added prior to pumping into the well.

* * * * *